United States Patent
Salib et al.

(10) Patent No.: US 7,430,468 B2
(45) Date of Patent: Sep. 30, 2008

(54) SYSTEM AND METHOD FOR SENSITIZING THE ACTIVATION CRITERIA OF A ROLLOVER CONTROL SYSTEM

(75) Inventors: Albert Chenouda Salib, Ypsilanti, MI (US); Jianbo Lu, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 895 days.

(21) Appl. No.: 10/619,051

(22) Filed: Jul. 14, 2003

(65) Prior Publication Data

US 2004/0030481 A1    Feb. 12, 2004

Related U.S. Application Data

(60) Provisional application No. 60/401,464, filed on Aug. 5, 2002, provisional application No. 60/401,416, filed on Aug. 5, 2002.

(51) Int. Cl.
*G06F 19/00* (2006.01)

(52) U.S. Cl. .......................... 701/70; 340/429; 340/440

(58) Field of Classification Search ............. 701/70–71, 701/41, 90, 91; 340/438, 440, 446; 180/172, 180/197
See application file for complete search history.

(56) References Cited

U.S. PATENT DOCUMENTS

| | | | |
|---|---|---|---|
| 2,917,126 A | 12/1959 | Phillips | |
| 3,604,273 A | 9/1971 | Kwok et al. | |
| 3,608,925 A | 9/1971 | Murphy | |
| 3,899,028 A | 8/1975 | Morris et al. | |
| 3,948,567 A | 4/1976 | Kasselmann et al. | |
| 3,972,543 A | 8/1976 | Presley et al. | |
| 4,023,864 A | 5/1977 | Lang et al. | |
| RE30,550 E | 3/1981 | Reise | |
| 4,480,714 A | 11/1984 | Yabuta et al. | |
| 4,592,565 A | 6/1986 | Eagle | |
| 4,597,462 A | 7/1986 | Sano et al. | |
| 4,650,212 A | 3/1987 | Yoshimura | |
| 4,679,808 A | 7/1987 | Ito et al. | |
| 4,690,553 A | 9/1987 | Fukamizu et al. | |
| 4,761,022 A | 8/1988 | Ohashi | |
| 4,765,649 A | 8/1988 | Ikemoto et al. | |

(Continued)

FOREIGN PATENT DOCUMENTS

DE    36 16 907    11/1987

(Continued)

OTHER PUBLICATIONS

A method for reducing on-road rollovers—anti-rollover braking, Thomas J. Wielenga, Dynamotive, LLC, International Congress and Exposition, Detroit, Michigan, Mar. 1-4, 1999.

(Continued)

*Primary Examiner*—Yonel Beaulieu
(74) *Attorney, Agent, or Firm*—Gary Smith

(57) ABSTRACT

A method for sensitizing the roll signal for a rollover control system (18) is provided. A sensitizing method for controlling a vehicle includes when the relative roll angle reaches a threshold, initiating a wheel departure angle determination, boosting control effort and controlling a safety system (38) in response to the computed roll angles.

18 Claims, 8 Drawing Sheets

U.S. PATENT DOCUMENTS

| | | | |
|---|---|---|---|
| 4,767,588 A | 8/1988 | Ito | |
| 4,778,773 A | 10/1988 | Sukegawa | |
| 4,809,183 A | 2/1989 | Eckert | |
| 4,827,416 A | 5/1989 | Kawagoe et al. | |
| 4,872,116 A | 10/1989 | Ito et al. | |
| 4,888,696 A | 12/1989 | Akatsu et al. | |
| 4,898,431 A | 2/1990 | Karnopp et al. | |
| 4,930,082 A | 5/1990 | Harara et al. | |
| 4,951,198 A | 8/1990 | Watanabe et al. | |
| 4,960,292 A | 10/1990 | Sadler | |
| 4,964,679 A | 10/1990 | Rath | |
| 4,967,865 A | 11/1990 | Schindler | |
| 4,976,330 A | 12/1990 | Matsumoto | |
| 4,998,593 A | 3/1991 | Karnopp et al. | |
| 5,033,770 A | 7/1991 | Kamimura et al. | |
| 5,058,017 A | 10/1991 | Adachi et al. | |
| 5,066,041 A | 11/1991 | Kindermann et al. | |
| 5,088,040 A | 2/1992 | Matsuda et al. | |
| 5,089,967 A | 2/1992 | Haseda et al. | |
| 5,163,319 A | 11/1992 | Spies et al. | |
| 5,200,896 A | 4/1993 | Sato et al. | |
| 5,208,749 A | 5/1993 | Adachi et al. | |
| 5,224,765 A | 7/1993 | Matsuda | |
| 5,228,757 A | 7/1993 | Ito et al. | |
| 5,239,868 A | 8/1993 | Takenaka et al. | |
| 5,247,466 A | 9/1993 | Shimada et al. | |
| 5,261,503 A | 11/1993 | Yasui | |
| 5,265,020 A | 11/1993 | Nakayama | |
| 5,278,761 A | 1/1994 | Ander et al. | |
| 5,282,134 A | 1/1994 | Gioutsos et al. | |
| 5,311,431 A | 5/1994 | Cao et al. | |
| 5,324,102 A | 6/1994 | Roll et al. | |
| 5,335,176 A | 8/1994 | Nakamura | |
| 5,365,439 A | 11/1994 | Momose et al. | |
| 5,370,199 A | 12/1994 | Akuta et al. | |
| 5,408,411 A | 4/1995 | Nakamura et al. | |
| 5,446,658 A | 8/1995 | Pastor et al. | |
| 5,510,989 A | 4/1996 | Zabler et al. | |
| 5,548,536 A | 8/1996 | Ammon | |
| 5,549,328 A | 8/1996 | Cubalchini | |
| 5,560,688 A | 10/1996 | Schappler et al. | |
| 5,579,245 A | 11/1996 | Kato | |
| 5,598,335 A | 1/1997 | You | |
| 5,602,734 A | 2/1997 | Kithil | |
| 5,610,575 A | 3/1997 | Gioutsos | |
| 5,627,756 A | 5/1997 | Fukada et al. | |
| 5,634,698 A | 6/1997 | Cao et al. | |
| 5,640,324 A | 6/1997 | Inagaki | |
| 5,648,903 A | 7/1997 | Liubakka | |
| 5,671,982 A | 9/1997 | Wanke | |
| 5,676,433 A | 10/1997 | Inagaki et al. | |
| 5,694,319 A | 12/1997 | Suissa et al. | |
| 5,703,776 A | 12/1997 | Soung | |
| 5,707,117 A | 1/1998 | Hu et al. | |
| 5,707,120 A | 1/1998 | Monzaki et al. | |
| 5,720,533 A | 2/1998 | Pastor et al. | |
| 5,723,782 A | 3/1998 | Bolles, Jr. | |
| 5,732,377 A | 3/1998 | Eckert | |
| 5,732,378 A | 3/1998 | Eckert et al. | |
| 5,732,379 A | 3/1998 | Eckert et al. | |
| 5,736,939 A | 4/1998 | Corcoran | |
| 5,737,224 A | 4/1998 | Jeenicke et al. | |
| 5,740,041 A | 4/1998 | Iyoda | |
| 5,742,918 A | 4/1998 | Ashrafi et al. | |
| 5,742,919 A | 4/1998 | Ashrafi et al. | |
| 5,762,406 A | 6/1998 | Yasui et al. | |
| 5,782,543 A | 7/1998 | Monzaki et al. | |
| 5,787,375 A | 7/1998 | Madau et al. | |
| 5,801,647 A | 9/1998 | Survo et al. | |
| 5,809,434 A | 9/1998 | Ashrafi et al. | |
| 5,816,670 A | 10/1998 | Yamada et al. | |
| 5,825,284 A | 10/1998 | Dunwoody et al. | |
| 5,857,535 A | 1/1999 | Brooks | |
| 5,869,943 A | 2/1999 | Nakashima et al. | |
| 5,878,357 A | 3/1999 | Sivashankar et al. | |
| 5,893,896 A | 4/1999 | Imamura et al. | |
| 5,925,083 A | 7/1999 | Ackermann | |
| 5,931,546 A | 8/1999 | Nakashima et al. | |
| 5,944,137 A | 8/1999 | Moser et al. | |
| 5,944,392 A | 8/1999 | Tachihata et al. | |
| 5,946,644 A | 8/1999 | Cowan et al. | |
| 5,964,819 A | 10/1999 | Naito | |
| 5,971,503 A | 10/1999 | Joyce et al. | |
| 6,002,974 A | 12/1999 | Schiffman | |
| 6,002,975 A | 12/1999 | Schiffman et al. | |
| 6,026,926 A | 2/2000 | Noro et al. | |
| 6,038,495 A | 3/2000 | Schiffmann | |
| 6,040,916 A | 3/2000 | Griesinger | |
| 6,050,360 A | 4/2000 | Pattok et al. | |
| 6,055,472 A | 4/2000 | Breunig et al. | |
| 6,062,336 A | 5/2000 | Amberkar et al. | |
| 6,065,558 A | 5/2000 | Wielenga | |
| 6,073,065 A | 6/2000 | Brown et al. | |
| 6,079,513 A | 6/2000 | Nishizaki et al. | |
| 6,081,761 A | 6/2000 | Harada et al. | |
| 6,085,860 A | 7/2000 | Hackl et al. | |
| 6,086,168 A | 7/2000 | Rump | |
| 6,089,344 A | 7/2000 | Baughn et al. | |
| 6,104,284 A | 8/2000 | Otsuka | |
| 6,122,568 A | 9/2000 | Madau et al. | |
| 6,122,584 A | 9/2000 | Lin et al. | |
| 6,129,172 A | 10/2000 | Yoshida et al. | |
| 6,141,604 A | 10/2000 | Mattes et al. | |
| 6,141,605 A | 10/2000 | Joyce | |
| 6,144,904 A | 11/2000 | Tseng | |
| 6,149,251 A | 11/2000 | Wuerth et al. | |
| 6,161,905 A | 12/2000 | Hac et al. | |
| 6,169,939 B1 | 1/2001 | Raad et al. | |
| 6,176,555 B1 | 1/2001 | Semsey | |
| 6,178,375 B1 | 1/2001 | Breunig | |
| 6,179,310 B1 | 1/2001 | Clare et al. | |
| 6,179,394 B1 | 1/2001 | Browalski et al. | |
| 6,184,637 B1 | 2/2001 | Yamawaki et al. | |
| 6,185,485 B1 | 2/2001 | Ashrafi et al. | |
| 6,186,267 B1 | 2/2001 | Hackl et al. | |
| 6,192,305 B1 | 2/2001 | Schiffmann | |
| 6,195,606 B1 | 2/2001 | Barta et al. | |
| 6,198,988 B1 | 3/2001 | Tseng | |
| 6,202,009 B1 | 3/2001 | Tseng | |
| 6,202,020 B1 | 3/2001 | Kyrtsos | |
| 6,206,383 B1 | 3/2001 | Burdock | |
| 6,219,604 B1 | 4/2001 | Dilger et al. | |
| 6,223,114 B1 | 4/2001 | Boros et al. | |
| 6,226,579 B1 | 5/2001 | Hackl et al. | |
| 6,233,510 B1 | 5/2001 | Platner et al. | |
| 6,263,261 B1 | 7/2001 | Brown et al. | |
| 6,266,596 B1 | 7/2001 | Hartman et al. | |
| 6,272,420 B1 | 8/2001 | Schramm et al. | |
| 6,278,930 B1 | 8/2001 | Yamada et al. | |
| 6,282,471 B1 | 8/2001 | Burdock et al. | |
| 6,282,472 B1 | 8/2001 | Jones et al. | |
| 6,282,474 B1 | 8/2001 | Chou et al. | |
| 6,292,734 B1 | 9/2001 | Murakami et al. | |
| 6,292,759 B1 | 9/2001 | Schiffmann | |
| 6,311,111 B1 | 10/2001 | Leimbach et al. | |
| 6,314,329 B1 | 11/2001 | Madau et al. | |
| 6,315,373 B1 | 11/2001 | Yamada et al. | |
| 6,321,141 B1 | 11/2001 | Leimbach | |
| 6,324,446 B1 | 11/2001 | Brown et al. | |
| 6,324,458 B1 | 11/2001 | Takagi et al. | |
| 6,330,522 B1 | 12/2001 | Takeuchi | |
| 6,332,104 B1 | 12/2001 | Brown et al. | |
| 6,338,012 B2 | 1/2002 | Brown et al. | |
| 6,349,247 B1 | 2/2002 | Schramm et al. | |

| | | | | | | |
|---|---|---|---|---|---|---|
| 6,351,694 | B1 | 2/2002 | Tseng et al. | FR | 24 25 342 | 12/1979 |
| 6,352,318 | B1 | 3/2002 | Hosomi et al. | GB | 2257403 | 1/1993 |
| 6,356,188 | B1 | 3/2002 | Meyers et al. | GB | 2 342 078 | 4/2000 |
| 6,370,938 | B1 | 4/2002 | Leimbach et al. | JP | 62055211 | 9/1985 |
| 6,394,240 | B1 | 5/2002 | Barwick | JP | 63116918 | 5/1988 |
| 6,397,127 | B1 | 5/2002 | Meyers et al. | JP | 63151539 | 6/1988 |
| 6,419,240 | B1 | 7/2002 | Burdock et al. | JP | 63203456 | 8/1988 |
| 6,428,118 | B1 | 8/2002 | Blosch | JP | 1101238 | 4/1989 |
| 6,438,464 | B1 | 8/2002 | Woywod et al. | JP | 2171373 | 7/1990 |
| 6,477,480 | B1 | 11/2002 | Tseng et al. | JP | 3042360 | 2/1991 |
| 6,496,758 | B2 | 12/2002 | Rhode et al. | JP | 3045452 | 2/1991 |
| 6,496,763 | B2 | 12/2002 | Griessbach | JP | 4008837 | 1/1992 |
| 6,498,976 | B1 | 12/2002 | Ehlbeck et al. | JP | 5016699 | 1/1993 |
| 6,547,022 | B2 | 4/2003 | Hosomi et al. | JP | 5254406 | 10/1993 |
| 6,554,293 | B1 | 4/2003 | Fennel et al. | JP | 6278586 | 10/1994 |
| 6,556,908 | B1 | 4/2003 | Lu et al. | JP | 6297985 | 10/1994 |
| 6,559,634 | B2 | 5/2003 | Yamada | JP | 6312612 | 11/1994 |
| 6,593,849 | B2 * | 7/2003 | Chubb et al. ............ 340/446 | JP | 8080825 | 3/1996 |
| 2002/0014799 | A1 | 2/2002 | Nagae | JP | 9005352 | 1/1997 |
| 2002/0040268 | A1 | 4/2002 | Yamada et al. | JP | 10024819 | 1/1998 |
| 2002/0056582 | A1 | 5/2002 | Chubb | JP | 10329682 | 12/1998 |
| 2002/0075139 | A1 | 6/2002 | Yamamoto et al. | JP | 11011272 | 1/1999 |
| 2002/0096003 | A1 | 7/2002 | Yamada et al. | JP | 11170992 | 6/1999 |
| 2002/0139599 | A1 | 10/2002 | Lu | JP | 11254992 | 9/1999 |
| | | | | JP | 11255093 | 9/1999 |
| | | | | JP | 11304663 | 10/1999 |
| | | | | JP | 11304662 | 11/1999 |
| | | | | SU | 816849 | 3/1981 |

FOREIGN PATENT DOCUMENTS

| | | |
|---|---|---|
| DE | 38 15 938 | 11/1989 |
| DE | 43 21 571 | 1/1994 |
| DE | 42 27 886 | 2/1994 |
| DE | 43 35 979 | 4/1995 |
| DE | 43 42 732 | 6/1995 |
| DE | 199 07 633 | 10/1999 |
| DE | 100 25 492 A1 | 5/2000 |
| DE | 100 65 010 A1 | 12/2000 |
| EP | 0 430 813 | 12/1993 |
| EP | 0 662 601 | 7/1995 |
| EP | 0 758 601 | 2/1997 |
| EP | 1 046 571 A2 | 4/2000 |
| EP | 1 197 409 A2 | 9/2001 |
| EP | 1 234 741 A2 | 8/2002 |

OTHER PUBLICATIONS

Eger, R., Majjad, R., Naser, N., "Rollover simulation based on a nonlinear model", SAE 98020.

Nalecz, A.G., Bindemann, A.C., Brewer H.K., "Dynamic analysis of vehicle rollover", 12th International Conference on Experimental Safety Vehicles, Goteborg, Sweden, May 29-Jun. 1, 1989.

Niii, N., Nishijima, Y., Nakagaw, K., "rollover analysis method of a large-size bus", JSAE 9540020, 1995.

Eger, R., Kiencke, U., "Modeling of rollover sequences", Control Engineering Practice 11 (2003) 209-216.

* cited by examiner

SYSTEM AND METHOD FOR SENSITIZING THE ACTIVATION CRITERIA OF A ROLLOVER CONTROL SYSTEM

RELATED APPLICATIONS

The present invention claims priority to U.S. provisional applications Ser. No. 60/401,464 and 60/401,416, filed Aug. 5, 2002, the disclosures of which are incorporated by reference herein. The present application is also related to U.S. application Ser. No. 10/619,007 now U.S. Pat. No. 6,961,648 entitled "SYSTEM AND METHOD FOR DESENSITIZING THE ACTIVATION CRITERIA OF A ROLLOVER CONTROL SYSTEM", filed simultaneously herewith.

TECHNICAL FIELD

The present invention relates generally to a control apparatus for controlling a system of an automotive vehicle in response to sensed dynamic behavior, and more specifically, to a method and apparatus for sensitizing the activation criteria based on vehicle operating conditions.

BACKGROUND

Dynamic control systems for automotive vehicles have recently begun to be offered on various products. Dynamic control systems typically control the yaw of the vehicle by controlling the braking effort at the various wheels of the vehicle. Yaw control systems typically compare the desired direction of the vehicle based upon the steering wheel angle and the direction of travel. By regulating the amount of braking at each corner of the vehicle, the desired direction of travel may be maintained. Typically, the dynamic control systems do not address rollover (wheels lifting) of the vehicle. For high profile vehicles in particular, it would be desirable to control the rollover characteristic of the vehicle to maintain the vehicle position with respect to the road. That is, it is desirable to maintain contact of each of the four tires of the vehicle on the road.

In vehicle rollover control, it is desired to alter the vehicle attitude such that its motion along the roll direction is prevented from achieving a predetermined limit (rollover limit) with the aid of the actuation from the available active systems such as controllable brake system, steering system and suspension system. Although the vehicle attitude is well defined, direct measurement is usually impossible.

During a potential vehicular rollover event, wheels on one side of the vehicle start lifting, and the roll center of the vehicle shifts to the contact patch of the remaining tires. This shifted roll center increases the roll moment of inertia of the vehicle, and hence reduces the roll acceleration of the vehicle. However, the roll attitude could still increase rapidly. The corresponding roll motion when the vehicle starts side lifting deviates from the roll motion during normal driving conditions.

When the wheels start to lift from the pavement, it is desirable to confirm this condition. This allows the system to make an accurate determination as to the appropriate correction. If wheels are on the ground, or recontact the ground after a lift condition, this also assists with accurate control.

Some systems use position sensors to measure the relative distance between the vehicle body and the vehicle suspension. One drawback to such systems is that the distance from the body to the road must be inferred. This also increases the number of sensors on the vehicle. Other techniques use sensor signals to indirectly detect wheel lifting qualitatively.

One example of a wheel lifting determination can be found in Ford patent U.S. Pat. No. 6,356,188 and U.S. patent application Ser. No. 10/608,909, now U.S. Pat. No. 7,109,856 both of which are incorporated by reference herein. The system applies a change in torque to the wheels to determine wheel lift. The output from such a wheel lifting determination unit can be used qualitatively. This method is an active determination since the basis of the system relies on changing the torque of the wheels by the application of brakes or the like. In some situations it may be desirable to determine wheel lift without changing the torque of a wheel.

Due to the inevitable dead spots due to the vehicle configuration, wheel lift detection methods may not be able to identify all the conditions where four wheels are absolutely grounded in a timely and accurate fashion. For example, if the torques applied to the wheels have errors, if the vehicle reference computation has errors or there is not enough excitation in the torque provided, the wheel lift detection may provide erroneous information or no information about the roll trending of the vehicle. Wheel lift information may also be safe-guarded by information regarding the vehicle roll angle information from the various sensors.

In certain driving conditions where the vehicle is moving with all four wheels contacting ground and the wheel lift detection does not detect the grounding condition, the roll information derived from the various sensors may be the sole information for identify vehicle roll trending. If in such driving cases, the vehicle experiences very large lateral acceleration and large roll rate, the grounded conditions might be replaced by erroneous lifting conditions. That is, those signals may predict that the vehicle is in a divergent roll event but the actual vehicle is not in a rolling event at all. Such cases include when the vehicle is driven on a mountain road, off-road or banked road, tire compression or an impact may cause a large normal load. The increased normal load causes a force component to be added to the lateral acceleration sensor output. Hence, a larger than 1 g lateral acceleration is obtained but the actual lateral acceleration of the vehicle projected along the road surface might be in 0.6 g range. An off-road driving condition may also be an off-camber driving condition. When a low speed vehicle is driven on an off-camber road with some hard tire compression or impact, the control system may be fooled to activate un-necessarily.

In order to reduce false activations, it would therefore be desirable to provide a rollover detection system that sensitizes and desensitizes the roll control determination.

SUMMARY

The present invention sensitizes and desensitizes the roll decision based upon various conditions to make the roll decision more accurate.

In one embodiment, a method of controlling an automotive vehicle comprises determining a relative roll angle, when the relative roll angle reaches a threshold, initiating a wheel departure angle determination, and controlling a safety system in response to the wheel departure angle.

In another embodiment, a method of controlling an automotive vehicle comprises determining a relative roll angle, determining when the vehicle is in a transitional maneuver, setting a roll signal for control to the relative roll angle.

One advantage of the invention is that some or all of the ways in which to sensitize and desensitize may be used alone or simultaneously to improve a safety system such as a rollover control system.

Other advantages and features of the present invention will become apparent when viewed in light of the detailed description of the preferred embodiment when taken in conjunction with the attached drawings and appended claims.

DETAILED DESCRIPTION

Figure 1:
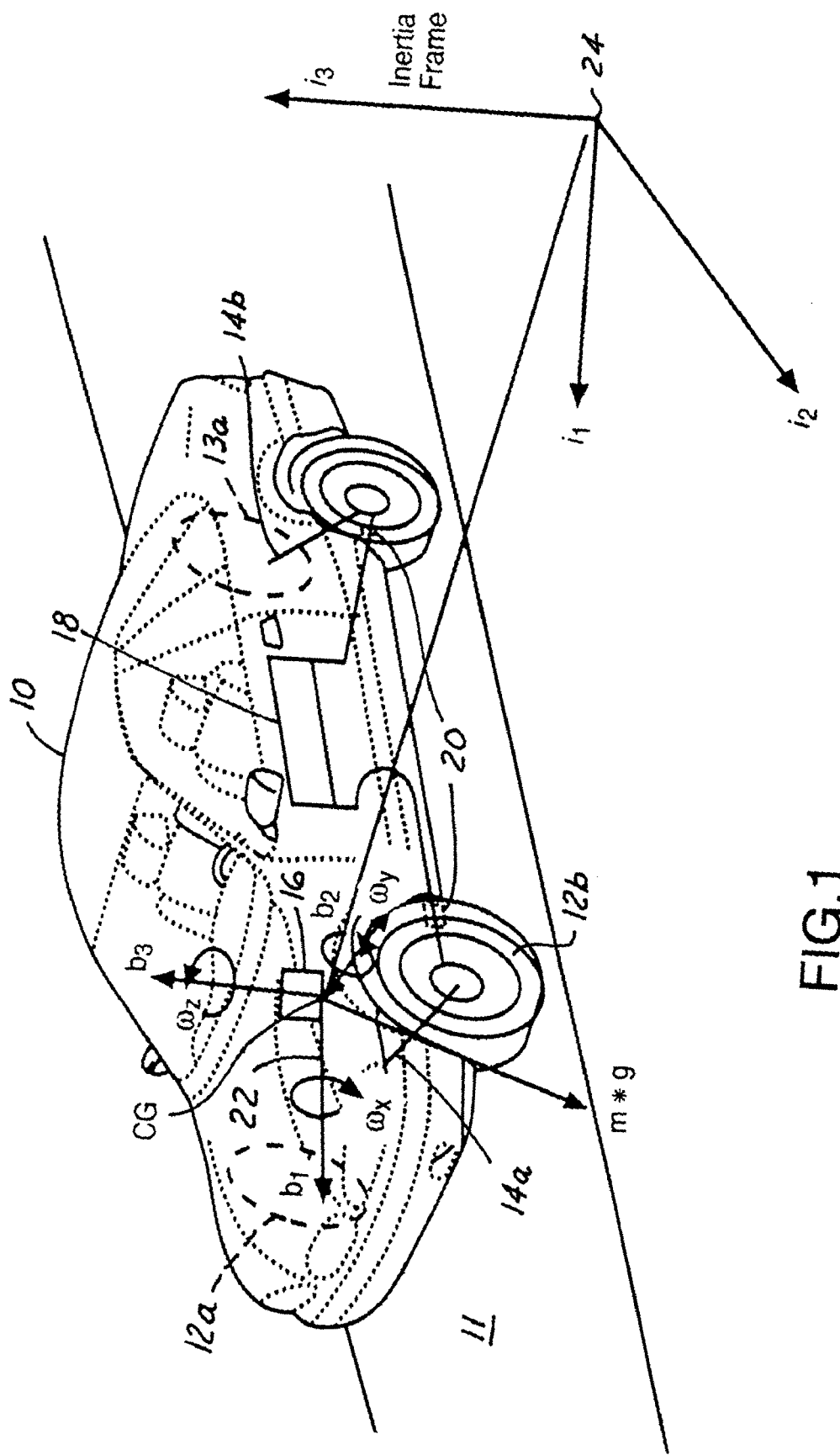
FIG. 1 is a diagrammatic view of a vehicle with variable vectors and coordinator frames.

In the following figures the same reference numerals will be used to identify the same components. The present teachings may be used in conjunction with a yaw control system or a rollover control system for an automotive vehicle. However, the present teachings may also be used with a deployment device such as airbag or roll bar.

Referring to FIG. 1, an automotive vehicle 10 on a road surface 11 with a safety system is illustrated with the various forces and moments thereon. Vehicle 10 has front right and front left tires 12a and 12b and rear right tires and rear left tires 13a and 13b, respectively. The vehicle 10 may also have a number of different types of front steering systems 14a and rear steering systems 14b including, having each of the front and rear wheels configured with a respective controllable actuator, the front and rear wheels having a conventional type system in which both of the front wheels are controlled together and both of the rear wheels are controlled together, a system having conventional front steering and independently controllable rear steering for each of the wheels, or vice versa. Generally, the vehicle has a weight represented as Mg at the center of gravity of the vehicle, where g=9.8 m/s² and M is the total mass of the vehicle.

As mentioned above, the system may also be used with active/semi-active suspension systems, anti-roll bar or other safety devices deployed or activated upon sensing predetermined dynamic conditions of the vehicle.

The sensing system 16 is part of a control system 18. The sensing system 16 may use a standard yaw stability control sensor set (including lateral acceleration sensor, yaw rate sensor, steering angle sensor and wheel speed sensor) together with a roll rate sensor and a longitudinal acceleration sensor. The various sensors will be further described below. The wheel speed sensors 20 are mounted at each corner of the vehicle, and the rest of the sensors of sensing system 16 may be mounted directly on the center of gravity of the vehicle body, along the directions x,y and z shown in FIG. 1. As those skilled in the art will recognize, the frame from $b_1$, $b_2$ and $b_3$ is called a body frame 22, whose origin is located at the center of gravity of the car body, with the $b_1$ corresponding to the x axis pointing forward, $b_2$ corresponding to the y axis pointing off the driving side (to the left), and the $b_3$ corresponding to the z axis pointing upward. The angular rates of the car body are denoted about their respective axes as $\omega_x$ for the roll rate, $\omega_y$ for the pitch rate and $\omega_z$ for the yaw rate. The calculations set forth herein may take place in an inertial frame 24 that may be derived from the body frame 22 as described below.

The angular rate sensors and the acceleration sensors are mounted on the vehicle car body along the body frame directions $b_1$, $b_2$ and $b_3$, which are the x-y-z axes of the vehicle's sprung mass.

The longitudinal acceleration sensor 36 is mounted on the car body located at the center of gravity, with its sensing direction along $b_1$-axis, whose output is denoted as $a_x$. The lateral acceleration sensor 32 is mounted on the car body located at the center of gravity, with its sensing direction along $b_2$-axis, whose output is denoted as $a_y$.

The other frame used in the following discussion includes the road frame, as depicted in FIG. 1. The road frame system $r_1 r_2 r_3$ is fixed on the driven road surface, where the $r_3$ axis is along the average road normal direction computed from the normal directions of the four-tire/road contact patches.

In the following discussion, the Euler angles of the body frame $b_1 b_2 b_3$ with respect to the road frame $r_1 r_2 r_3$ are denoted as $\theta_{xr}$, $\theta_{yr}$ and $\theta_{zr}$, which are also called the relative Euler angles.

Figure 2:
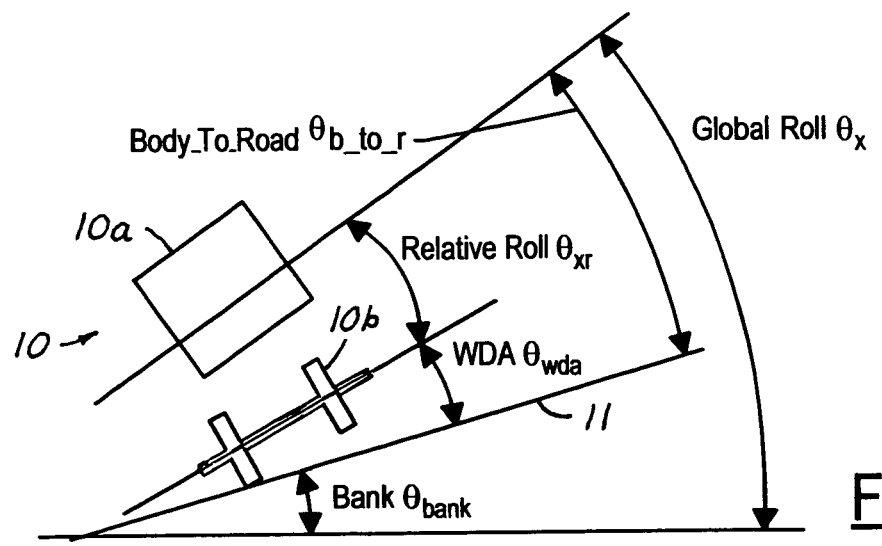
FIG. 2 is an end view of an automotive vehicle on a bank with definitions of various angles including global roll angle, relative roll angle, wheel departure angle (WDA), road bank angle and body-to-road angle.

Referring now to FIG. 2, the relationship of the various angles of the vehicle 10 relative to the road surface 11 is illustrated. One angle is a wheel departure angle $\theta_{wda}$, which is the angle from the axle or the wheel axis to the road surface 11. Also shown is a reference road bank angle $\theta_{bank}$, which is shown relative to the vehicle 10 on a road surface. The vehicle 10 has a vehicle body 10a and vehicle suspension 10b. The relative roll angle $\theta_{xr}$ is the angle between the wheel axle and the body 10a. The global roll angle $\theta_x$ is the angle between the horizontal plane (e.g., at sea level) and the vehicle body 10a.

Figure 3A:
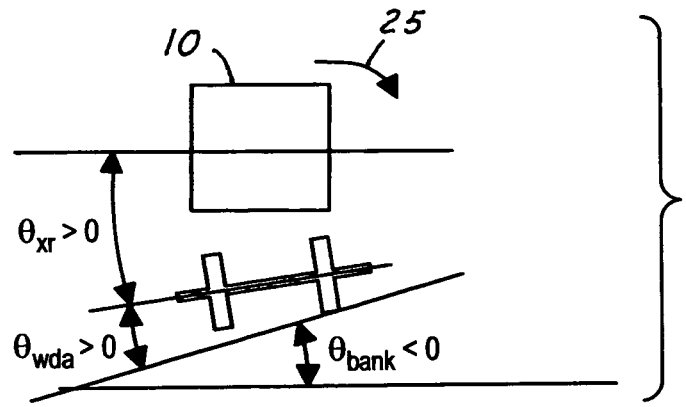
FIG. 3A is an end view of an on-camber divergent vehicle tendency.

Referring now to FIG. 3A, vehicle 10 is illustrated in an on-camber divergent state. The on-camber divergent state refers to the vehicle having a greater than zero wheel departure angle, a greater than zero relative roll angle, and a moment represented by arrow 25 tending to increase the relative roll angle and the wheel departure angle. In this example, the bank angle is less than zero.

Figure 3B:
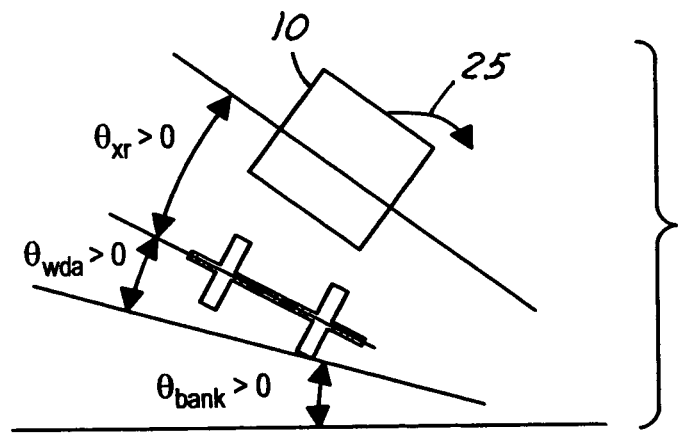
FIG. 3B is an end view of an automotive vehicle in an off-camber divergent condition.

In FIG. 3B, when the bank angle is greater than zero, the wheel departure angle is greater than zero, the relative roll angle is greater than zero and the moment is also to the right or increasing the relative roll angle and the wheel departure angle, the vehicle is in an off-camber divergent state.

Figure 3C:
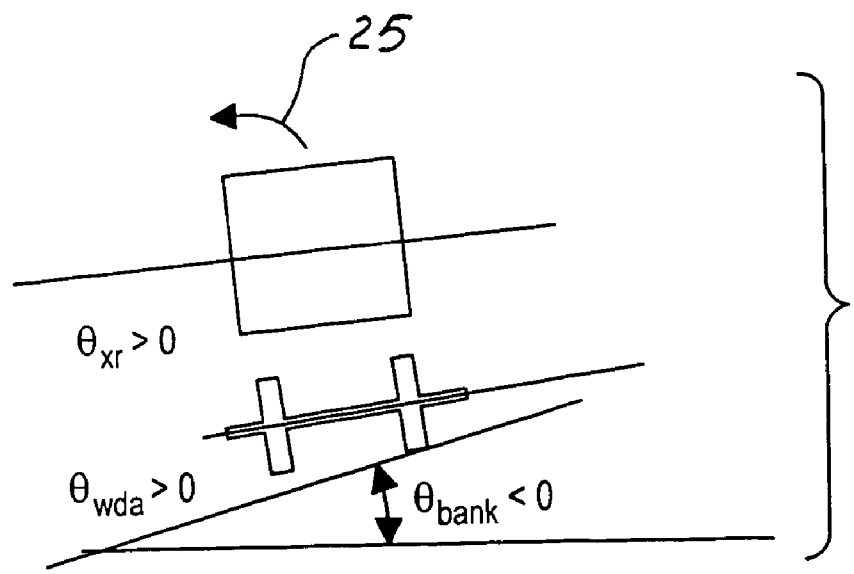
FIG. 3C is an end view of a vehicle in an on-camber convergent condition.

Referring now to FIG. 3C, a bank angle of less than zero, a wheel departure angle greater than zero, and a relative roll angle greater than zero is shown with a roll moment 25 acting to the left. Thus, the vehicle is in an on-camber convergent state. That is, the convergent state refers to the vehicle tending towards not overturning.

Figure 3D:
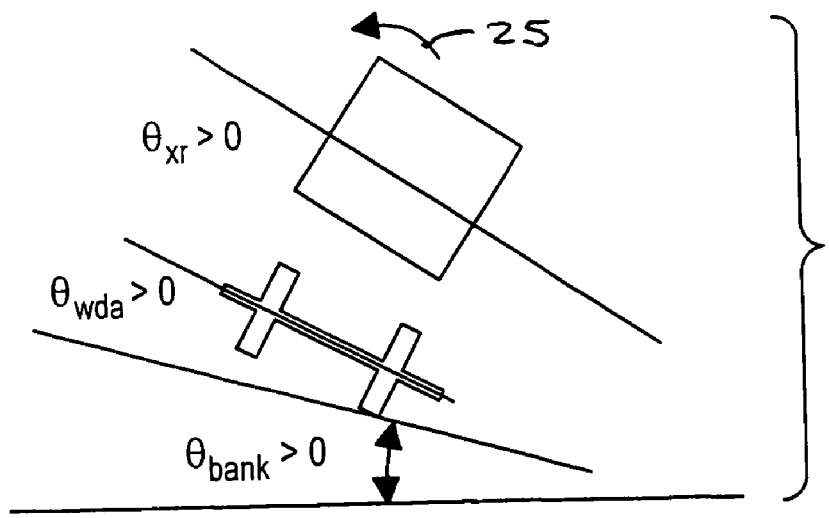
FIG. 3D is an end view of a vehicle in an off-camber convergent condition.

Referring now to FIG. 3D, when the bank angle is greater than 0, the wheel departure angle is greater than zero, and the relative roll angle is greater than zero and the roll moment is tending to the left, the vehicle is in an off-camber convergent state. That is, the vehicle is tending toward not rolling over.

Figure 4A:
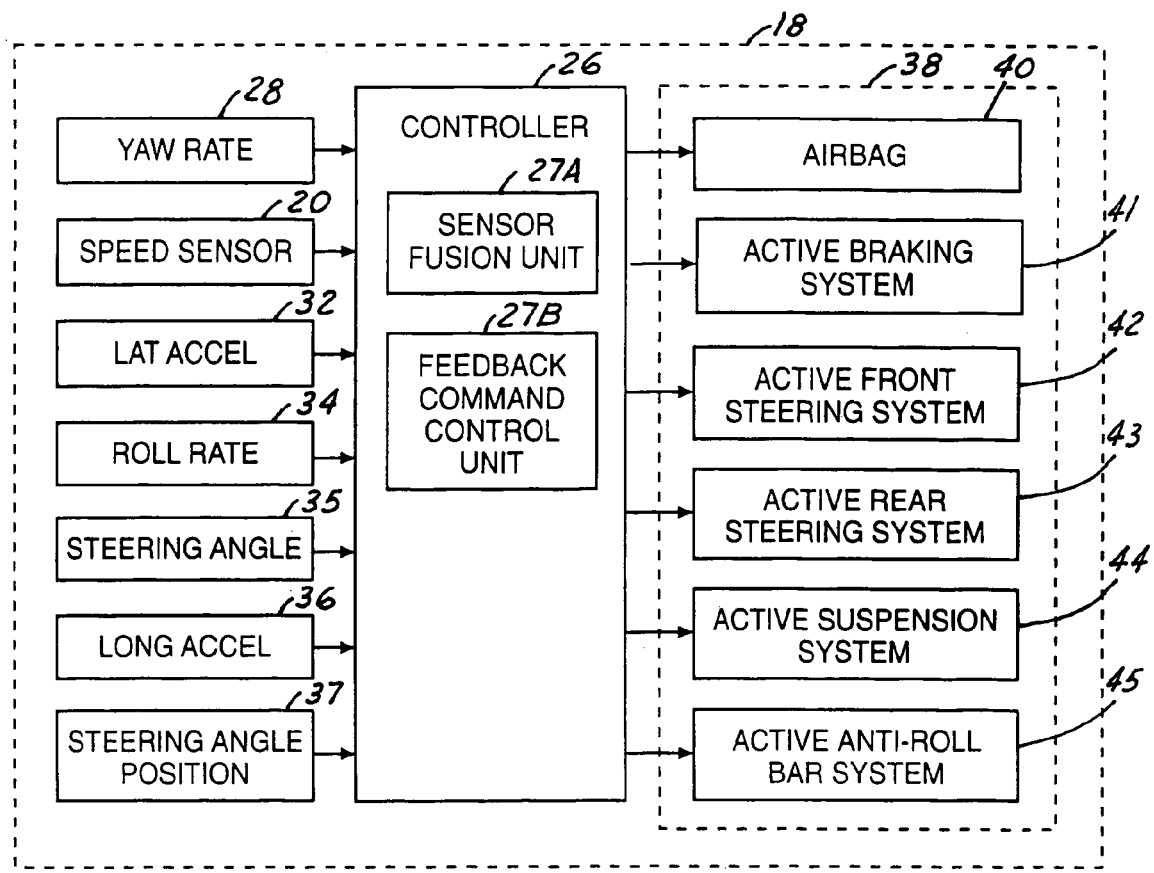
FIG. 4A is a block diagram of a stability control system.
Figure 4B:
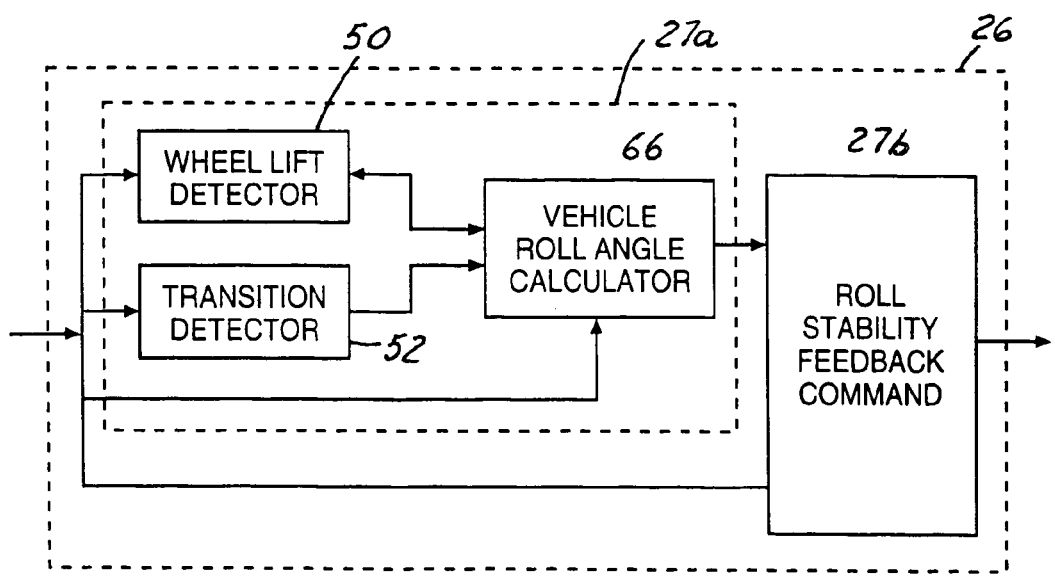
FIG. 4B is a block diagram of the controller 26 used in the stability control system depicted in FIG. 4A.

Referring now to FIG. 4A, one embodiment of a roll stability control system 18 is illustrated in further detail having a controller 26 used for receiving information from a number of sensors which may include a yaw rate sensor 28, a speed sensor 20, a lateral acceleration sensor 32, a roll rate sensor 34, a steering angle sensor (hand wheel position) 35, a longitudinal acceleration sensor 36, and steering angle position sensor 37.

In one embodiment, the sensors are located at the center of gravity of the vehicle. Those skilled in the art will recognize that the sensors may also be located off the center of gravity and translated equivalently thereto.

Lateral acceleration, roll orientation and speed may be obtained using a global positioning system (GPS). Based upon inputs from the sensors, controller 26 may control a safety device 38. Depending on the desired sensitivity of the system and various other factors, not all the sensors 20, 28, 32, 34, 35, 36, and 37, or various combinations of the sensors, may be used in a commercial embodiment. Safety device 38 may control an airbag 40, an active braking system 41, an active front steering system 42, an active rear steering system 43, an active suspension system 44, and an active anti-roll bar system 45, or combinations thereof. Each of the systems 40-45 may have their own controllers for activating each one. As mentioned above, the safety system 38 may be at least the active braking system 41.

Roll rate sensor 34 may sense the roll condition of the vehicle based on sensing the height of one or more points on the vehicle relative to the road surface. Sensors that may be used to achieve this include a radar-based proximity sensor, a laser-based proximity sensor and a sonar-based proximity sensor.

Roll rate sensor 34 may also sense the roll condition based on sensing the linear or rotational relative displacement or displacement velocity of one or more of the suspension chassis components which may include a linear height or travel sensor, a rotary height or travel sensor, a wheel speed sensor used to look for a change in velocity, a steering wheel position sensor, a steering wheel velocity sensor and a driver heading command input from an electronic component that may include steer by wire using a hand wheel or joy stick.

The roll condition may also be sensed by sensing the force or torque associated with the loading condition of one or more suspension or chassis components including a pressure transducer in active air suspension, a shock absorber sensor such as a load cell, a strain gauge, the steering system absolute or relative motor load, the steering system pressure of the hydraulic lines, a tire lateral force sensor or sensors, a longitudinal tire force sensor, a vertical tire force sensor or a tire sidewall torsion sensor.

The roll condition of the vehicle may also be established by one or more of the following translational or rotational positions, velocities or accelerations of the vehicle including a roll gyro, the roll rate sensor 34, the yaw rate sensor 28, the lateral acceleration sensor 32, a vertical acceleration sensor, a vehicle longitudinal acceleration sensor, lateral or vertical speed sensor including a wheel-based speed sensor, a radar-based speed sensor, a sonar-based speed sensor, a laser-based speed sensor or an optical-based speed sensor.

Based on the inputs from sensors 20, 28, 32, 34, 35, 36, 37, controller 26 determines a roll condition and controls any one or more of the safety devices 40-45.

Speed sensor 20 may be one of a variety of speed sensors known to those skilled in the art. For example, a suitable speed sensor 20 may include a sensor at every wheel that is averaged by controller 26. The controller 26 translates the wheel speeds into the speed of the vehicle. Yaw rate, steering angle, wheel speed and possibly a slip angle estimate at each wheel may be translated back to the speed of the vehicle at the center of gravity. Various other algorithms are known to those skilled in the art. For example, if speed is determined while speeding up or braking around a corner, the lowest or highest wheel speed may not be used because of its error. Also, a transmission sensor may be used to determine vehicle speed.

Figure 5:
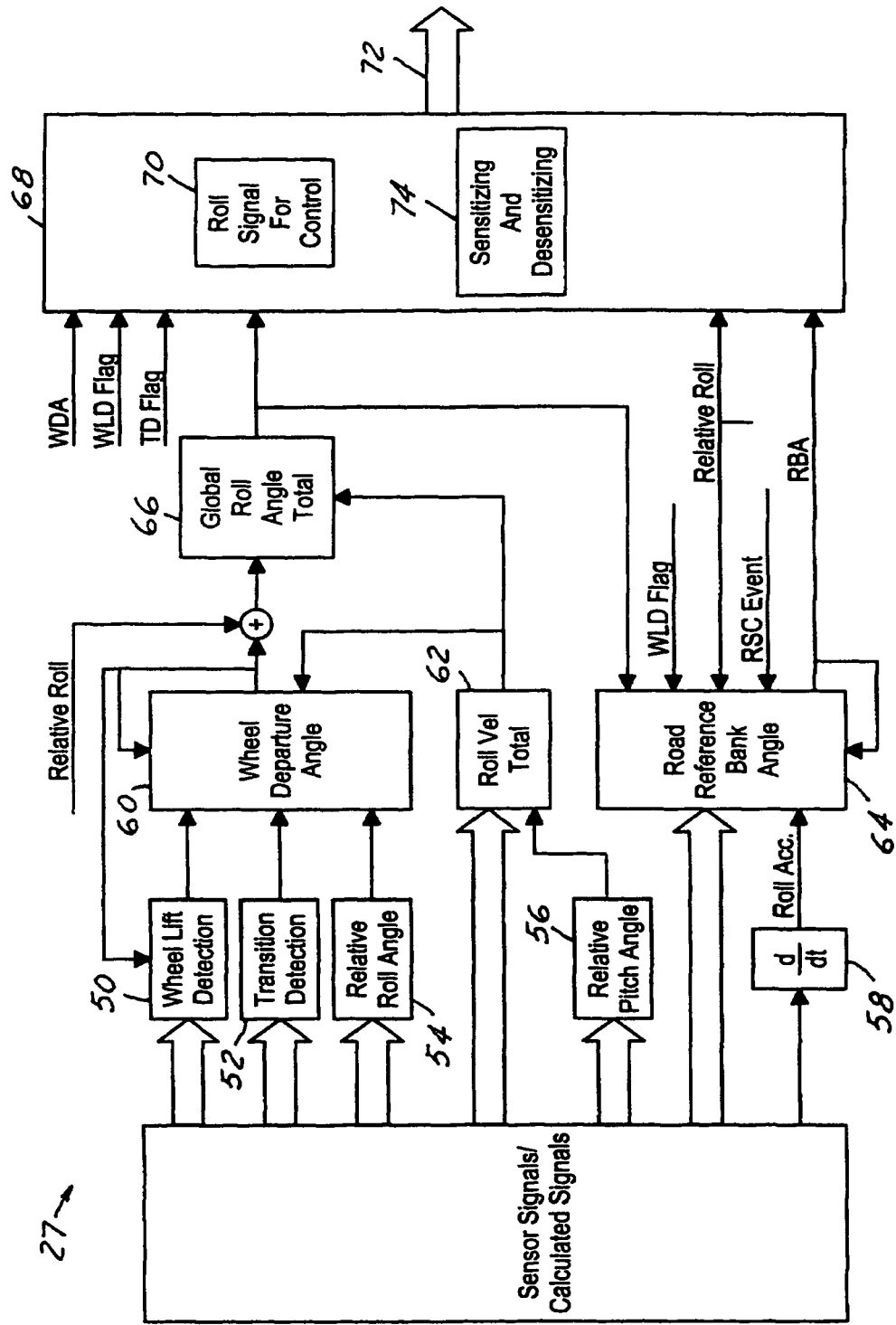
FIG. 5 is a block diagrammatic view of the unit 27 depicted in FIG. 4B, which is used for quantitatively and qualitatively determining rollover trend of a vehicle.

Referring now to FIG. 5, the sensor fusion unit 27A is illustrated in further detail. The sensor fusion unit 27A receives the various sensor signals, 20, 28, 32, 34, 35, 36, 37 and integrates all the sensor signals with the calculated signals to generate signals suitable for roll stability control algorithms. From the various sensor signals wheel lift detection may be determined by the wheel lift detector 50. Wheel lift detector 50 includes both active wheel lift detection and passive wheel lift detection, and wheel grounding condition detection. Wheel lift detector is described in U.S. provisional application Ser. No. 60/400,375 filed Aug. 1, 2002, and U.S. patent application Ser. No. 10/608,909 now Pat. No. 7,109,856 which are incorporated by reference herein. The modules described below may be implemented in hardware or software in a general purpose computer (microprocessor). From the wheel lift detection module 50, a determination of whether each wheel is absolutely grounded, possibly grounded, possibly lifted, or absolutely lifted may be determined. Transition detection module 52 is used to detect whether the vehicle is experiencing aggressive maneuver due to sudden steering wheel inputs from the driver. The sensors may also be used to determine a relative roll angle in relative roll angle module 54. Relative roll angle may be determined in many ways. One way is to use the roll acceleration module 58 in conjunction with the lateral acceleration sensor. As described above, the relative roll angle may be determined from the roll conditions described above.

The various sensor signals may also be used to determine a relative pitch angle in relative pitch angle module 56 and a roll acceleration in roll acceleration module 58. The outputs of the wheel lift detection module 50, the transition detection module 52, and the relative roll angle module 54 are used to determine a wheel departure angle in wheel departure angle module 60. Various sensor signals and the relative pitch angle in relative pitch angle module 56 are used to determine a relative velocity total in module 62. The road reference bank angle block 64 determines the bank angle. The relative pitch angle, the roll acceleration, and various other sensor signals as described below are used to determine the road reference bank angle. Other inputs may include a roll stability control event (RSC) and/or the presence of a recent yaw stability control event, and the wheel lifting and/or grounding flags.

The global roll angle of the vehicle is determined in global roll angle module 66. The relative roll angle, the wheel departure angle, and the roll velocity total blocks are all inputs to the global roll angle total module 66. The global roll angle total block determines the global roll angle $\theta_x$. An output module 68 receives the global roll angle total module 66 and the road reference bank angle from the road reference bank angle module 64. A roll signal for control is developed in roll signal module 70. The roll signal for control is illustrated as arrow 72. A sensitizing and desensitizing module 74 may also be included in the output module 68 to adjust the roll signal for control.

In the reference road bank angle module 64, the reference bank angle estimate is calculated. The objective of the reference bank estimate is to track a robust but rough indication of the road bank angle experienced during driving in both stable and highly dynamic situations, and which is in favor for roll stability control. That is, this reference bank angle is adjusted based on the vehicle driving condition and the vehicle roll condition. Most importantly, when compared to the global roll estimate, it is intended to capture the occurrence and physical magnitude of a divergent roll condition (two wheel lift) should it occur. This signal is intended to be used as a comparator against the global roll estimate for calculating the error signal, which is fed back to roll stability controller 26.

Figure 6:
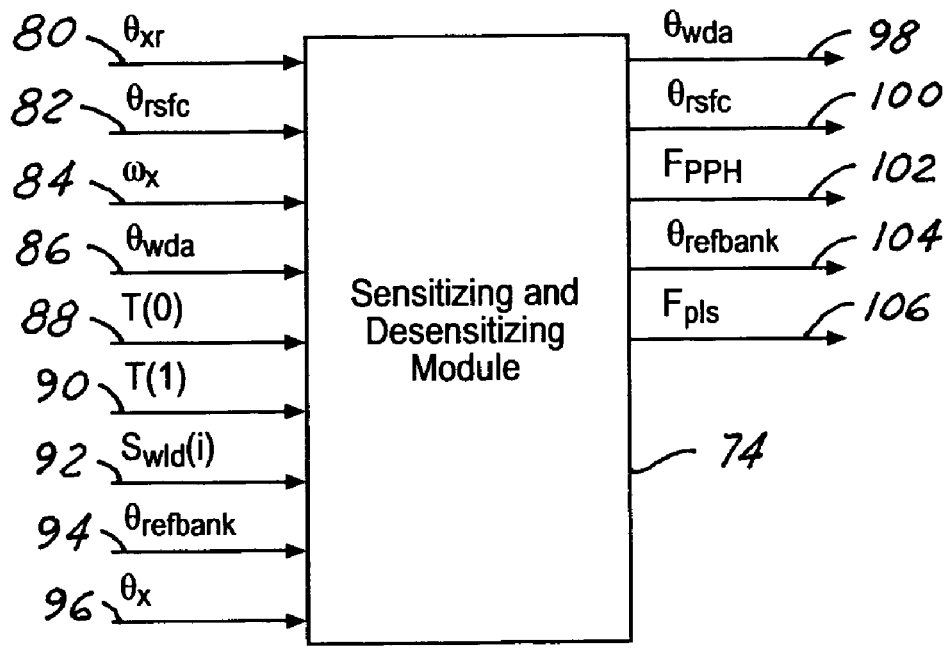
FIG. 6 is more detailed view of the sensitizing and desensitizing block of FIG. 5.

Referring now to FIG. 6, the operation of the sensitizing/desensitizing module 74 is described in further detail. In this module, the needed control effort used in the roll stability control RSC system is sensitized by deliberately increasing certain thresholds, boosting certain signals and holding certain variables in order to cope with scenarios where the vehicle is in divergent roll trend; the control effort used in RSC is desensitized by deliberately decreasing certain thresholds, exiting holding mode and inserting hysteresis in certain variables in order to cope with the scenarios where the vehicle is not in divergent roll trend but the vehicle sensors cannot distinguish such no-divergent roll trend with the divergent or unstable dynamics. In summary, the sensitization is used to boost the control effort in the side of the vehicle needed, and desensitization is used to detune the control effort in the un-needed side so as to reduce false activations in non-rollover events.

The module has various external inputs that include a relative roll angle $\theta_{xr}$ input 80; a roll signal for control $\theta_{rsfc}$ input 82; a roll rate $\omega_x$ 84; a wheel departure angle $\theta_{wda}$ input 86, a first transitional flag input 88 for left to right transition denoted as T(0) and a second transitional flag 90 denoted as T(1) for right to left transition. The transitional flags are set as the vehicle change from a right to left turn and a left to right turn. The generation of the transitional flags is described in provisional application 60/401,416 which is incorporated by reference herein. Other inputs include a final wheel lift status flags input 92 that is denoted by $S_{wld}(i)$. The final wheel lift status flag is set so:

If the ith wheel is absolutely grounded, then $S_{wld}(i)$=ABSOLUTELY_GROUNDED

If the ith wheel is in the edge of grounding, $S_{wld}(i)$=POSSIBLY_GROUNDED

If the ith wheel is absolutely lifted, then | $S_{wld}(i)$=ABSOLUTELY_LIFTED

If the ith wheel is in the edge of lifting | $S_{wld}(i)$=POSSIBLY_LIFTED

If the ith wheel's status cannot be firmly identified, $S_{wld}(i)$=NO_INDICATION Other inputs include a reference bank angle input 94 denoted as $\theta_{refbank}$ and a global roll angle input 96 $\theta_x$ The outputs of the module 74 include a wheel departure angle output 98 denoted by $\theta_{wda}$, a roll signal for control output 100 denoted by $\theta_{rsfc}$, a proper-peak-hold flag: output 102 denoted by $F_{PPH}$, a reference bank angle output 104 denoted $\theta_{refbank}$ and a pre-lift sensing flag output 106 denoted by $F_{PLS}$.

PREDEFINED CALIBRATABLE PARAMETER DEFINITIONS

The module 74 also includes various parameters and thresholds that are defined as follows:

$\Theta_{sensitize}$: the threshold for the relative roll angle used for sensitizing wheel departure angle during transitional maneuvers. Default value used in the present example=45% of roll gradient.

α: percentage of relative roll angle boosted for roll signal for control during double wheel lift events.

$\Theta_{wheel-normal-condition}$: the threshold for the relative roll angle for starting the computation of the wheel departure angle during normal driving condition. Default value used in the present example=75% of the roll gradient.

$\Theta_{non-transition}$: the threshold for the relative roll angle used in starting to adjust the reference bank during non-transitional maneuvers. Default value used in the present example=80% of roll gradient.

$\Delta\Theta$: the threshold for wheel departure angle drop during to sequential loops used for exiting proportional peak hold mode in PID controller. Default value used in the present example=4 degree.

$\Omega_{PPH}$: threshold for the roll angular rate in order to enter proportional peak hold mode. Default value=used in the present example 16 degree per second.

$\Theta_{PLS}$: the threshold for the wheel departure angle in order to start the pre-lift sensing. Default value used in the present example=1 degree.

T: the threshold for the drive torque at a wheel to start the pre-lift sensing.

Sensitization

Figure 7:
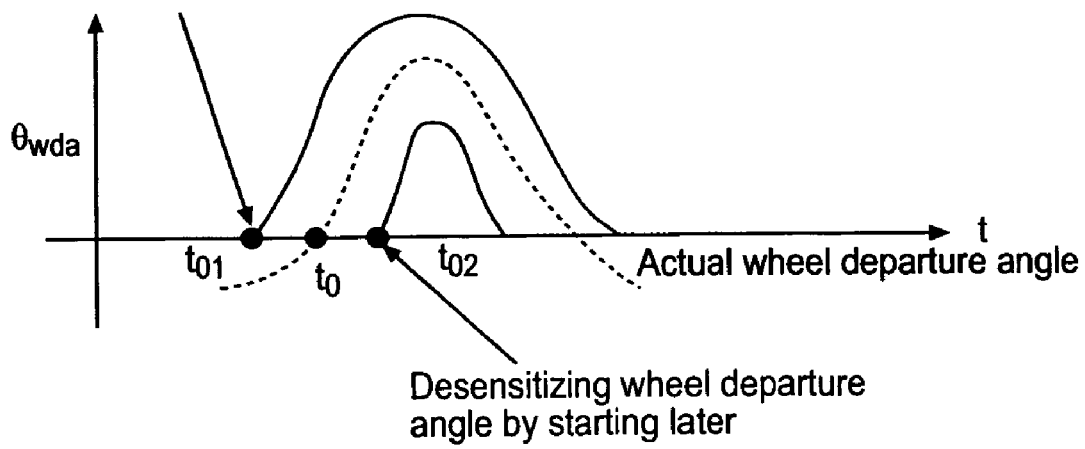
FIG. 7 is a plot of wheel departure angle versus time for normal conditions and for those of the present embodiment.

Referring now to FIG. 7, the starting point of computing the wheel departure angle is assumed to be at the time instant where one of the tires is at the edge of losing its normal load, or at the edge of being lifted. The exact time, however, is not typically detectable. Considering all the uncertainties in a vehicle, the approximated timing may be identified based on the wheel lift detection and the vehicle roll information. As shown in FIG. 7, the time instant where the tire is about to lift is illustrated as $t_0$, then before $t_0$ at time $t_{01}$, the wheel departure angle must have negative value. The wheel departure angle is reset to zero when the computation start. Thus if the computation is started at a time instant earlier than $t_0$, the negative wheel departure angle due to tire compression (usually around 1 degree) will be added to the computed wheel departure angle to effectively boost the wheel departure angle. This sensitizes the wheel departure angle. If the start timing for computing wheel departure angle is later than $t_0$ at time $t_{02}$, the magnitude of the calculated wheel departure angle will be less than the magnitude of the actual value, hence desensitizes the wheel departure angle.

Figure 8:
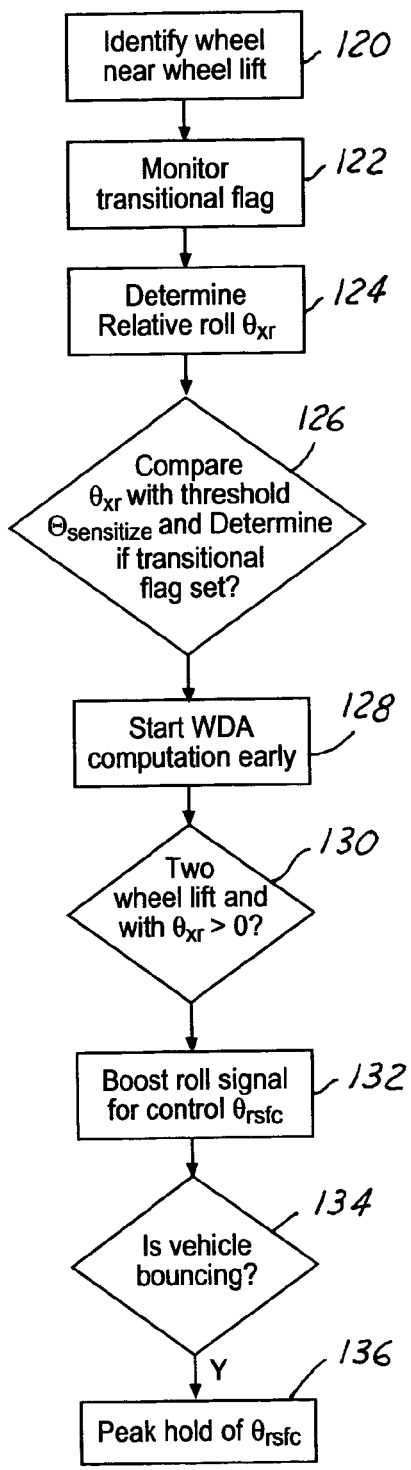
FIG. 8 is flow chart of the operation of one embodiment of sensitizing according to one embodiment of the present invention.

Referring now to FIG. 8, if the vehicle is near wheel lifting in step 120, in step 122 the transitional flags are monitored. The vehicle left to right transitional or right to left transitional flags are set to be active due to a dynamic transitional maneuver of the vehicle. In such a case, the vehicle may have a very large roll rate and hence a high roll trend. In this case any late computation of the wheel departure will desensitize the control effort which will have adverse control effect. Hence in this case the wheel departure angle computation is sensitized such that a needed control effort can be boosted.

```
if( (T(0) = 1 & & θ_xr ≧ Θ_sensitize)
   || (T(1) == 1 & & θ_xr ≦ -Θ_sensitize)
{
    Compute wheel departure angle;
}
else if the normal conditions are met
{
    Exit computing wheel departure angle;
}
```

The relative roll angle is determined in step 124. Notice that if the normal condition for computing wheel departure starts at a relative roll magnitude $\Theta_{normal}$, then the threshold $\Theta_{sensitize}$ for sensitizing wheel departure angle during transitional maneuver could be as small as 50% of $\Theta_{normal}$. In step 126 the transitional flags are monitored and the relative roll angle $\theta_{xr}$ exceeds or is equal to the sensitizing threshold and the left to right transition flag is set or the right to left transition flag is set and the relative roll angle $\theta_{xr}$ is less than or equal to a negative $\Theta_{sensitize}$ threshold. The boosted wheel departure angle is obtained by starting the calculation earlier than at a nominal time $t_0$ as described above in step 128. The boosted wheel departure angle will add certain amount of roll angle to the final roll signal for control $\theta_{rsfc}$, hence help increase certain amount of control effort.

If the wheel lift detection methods identify that two wheels at the inside of a turn are both lifted in step 130, then the vehicle is in a progressive rollover event. In this case significant control effort is required in order to fully control the vehicle body such that rollover can be prevented. One sensitizing method is to further boost the roll signal for control as in step 132 as set forth in the following:

```
if((S_wld(0) == 1 & & S_wld(2) == 1 & &θ_xr > 0)
   || (S_wld(1) == 1 & & S_wld(3) == 1 & &θ_xr ≦ 0))
{
    θ_rsfc = θ_rsfc + α% * θ_xr;
}
``` where α is the percentage of the desired boost. The default value in this example is 10.

In step 134 whether the vehicle is bouncing is determined. When the vehicle has very large roll angle together with a large magnitude of the roll rate during last second, the vehicle will be in a potential bouncing mode. In this case a proportional peak hold of the brake pressure (roll control effort) is conducted. A proportional control term is calculated in:

```
if (vehicle is in bouncing mode)
{
    Proportianl_control_term = K_p θ_rsfc-peak
}
else
{
    Proportianl_control_term = K_p θ_rsfc
}
``` where $\theta_{rsfc-peak}$ is the peak value of the roll signal for control during a specific period of time in step 136.

Desensitization

Figure 9:
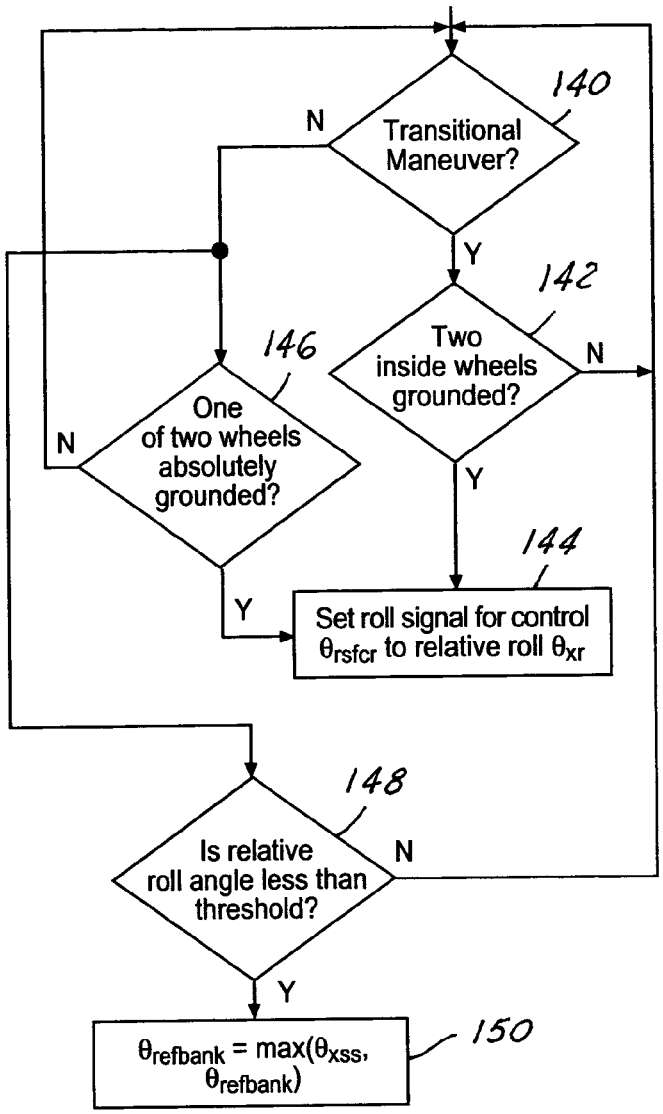
FIG. 9 is flow chart of the operation of one embodiment of desensitizing according to one embodiment of the present invention.

Referring now to FIG. 9, as mentioned above it may also be desirable to desensitize the system in certain situations. For example, during a transitional maneuver, the roll signal for control $\theta_{rsfc}$ will be reduced to relative roll angle $\theta_{xr}$ if the wheel lift detection algorithms identify that the two wheel at the inside of a turn are absolutely grounded. In this case, the vehicle is not in any roll divergence and the roll angle between the vehicle body and the road surface is exactly the relative roll angle $\theta_{xr}$. Since usually $\theta_{xr}$ alone will not be able to initiate PID control, hence resetting $\theta_{rsfc}$ to $\theta_{xr}$ will exit RSC control. This is set forth in step 140 by first determining if the vehicle is in a transitional maneuver. If the inside wheels are absolutely grounded in step 142 (and there is some roll angle in the right direction) then the roll signal for control is set to the relative roll angle in step 144.

```
if( (T(0) == 1
     & &S_wld(1) == ABSOLUTELY_GROUNDED
     & &S_wld(3) == ABSOLUTELY_GROUNDED
     & &θ_xr ≦ 0)
     (T(1) == 1
     & &S_wld(0) == ABSOLUTELY_GROUNDED
     & &S_wld(2) == ABSOLUTELY_GROUNDED
     & &θ_xr > 0) )
{
    θ_rsfc = θ_xr + θ_wda = θ_xr;
}
```

During non-transitional maneuver, the roll signal for control $\theta_{rsfc}$ will be reduced to relative roll angle $\theta_{xr}$ if the wheel lift detection algorithms identify that one of the two inside wheels at a turn is absolutely grounded. In this case, the vehicle is not in any roll divergence and the roll angle between the vehicle body and the road surface is exactly the relative roll angle $\theta_{xr}$. Since usually $\theta_{xr}$ alone will not be able to initiate PID control, hence resetting $\theta_{rsfc}$ to $\theta_{xr}$ will exit RSC control. This is carried out in step 140 when there is no transitional maneuver. In step 146 whether one of two inside wheels is grounded is determined. If one of the two inside wheels are grounded, step 144 is again executed in which the roll signal for control is set to the relative roll angle. This is set forth in the following code.

```
if( (T(0) == 0
     & &(S_wld(1) == ABSOLUTELY_GROUNDED
        || S_wld(3) == ABSOLUTELY_GROUNDED)
     & &θ_xr ≦ 0)
     (T(1) == 0
     & &(S_wld(0) == ABSOLUTELY_GROUNDED
        || S_wld(2) == ABSOLUTELY_GROUNDED)
     & &θ_xr > 0) )
{
    θ_rsfc = θ_xr + θ_wda = θ_xr;
}
```

In non-transitional maneuver, the reference bank is updated when the magnitude of the relative roll angle is less than a $\Theta_{non-transition}$ threshold, which is larger than the $\Theta_{wda-normal-condition}$ threshold in step 148. Hence there is a gap of the relative roll angle which is used to provide certain hysteresis in reference bank angle computation. If the magnitude of the relative roll angle is under the $\Theta_{non-transition}$ threshold but greater than $\Theta_{wda-normal-condition}$, even wheel departure angle is already starting to be computed, the reference bank angle will wait until the relative roll angle exceeds $\Theta_{non-transition}$ threshold to be adjusted, and hence the roll signal for control to be adjusted. That is, the reference road bank $\theta_{ref}$ is set to the maximum of the global roll angle $\theta_x - \theta_{xss}$ or the previously determined reference bank angle. This is set forth in the following code:

```
if (( θ_xr < -Θ_non-transition
        & & ( S_wld(1) != ABSOLUTELY_GROUNDED
            || S_wld(3) != ABSOLUTELY_GROUNDED ))
    ||( θ_xr ≧ Θ_non-transition
        & & ( S_wld(0) != ABSOLUTELY_GROUNDED
            || S_wld(2) != ABSOLUTELY_GROUNDED )))
{
    θ_ref-bank = max(θ_x - θ_xss, θ_ref-bank);
}
``` where $\theta_{xss} = \theta_x - \theta_{xr} - \theta_{wda}$.

Figure 10:
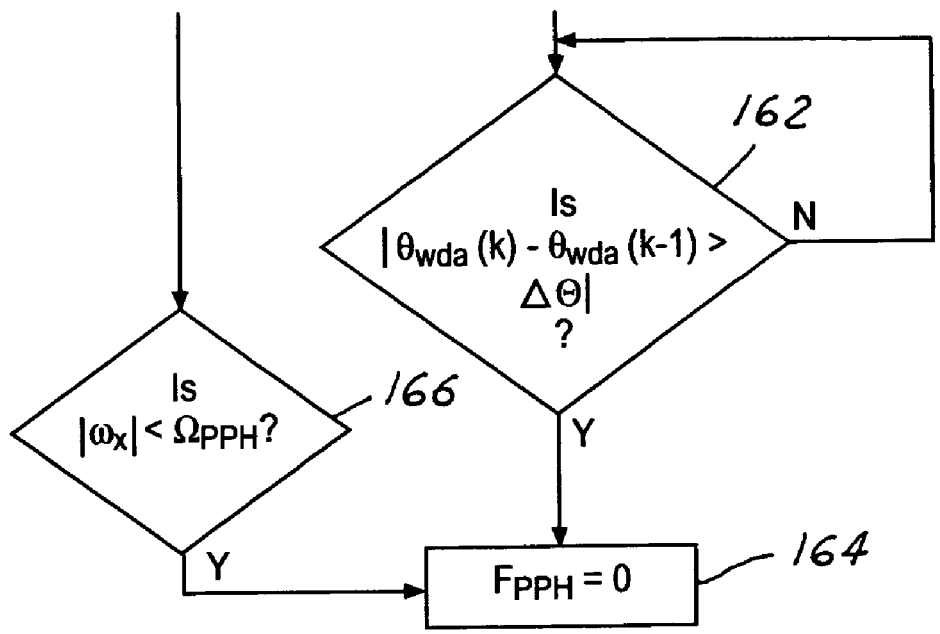
FIG. 10 is a flow chart illustrating exiting a proportional peak hold strategy.

Referring now to FIG. 10, in step 162 if the incremental correction for the wheel departure angle for two sequential loops exceeds certain magnitude $\Delta\Theta$ (default value=4 degree), the RSC will exit proportional peak brake pressure holding by resetting the flag $F_{PPH}$ to zero in step 164. In step 162 the previous wheel departure angle is subtracted from a current wheel departure angle. In this case, the self adjusting feature of the wheel departure angle computation implies that the vehicle is not in a divergent roll motion, hence holding brake pressure will cause the driver an un-easy feeling. Exiting enforced proportional peak hold pressure will allow the roll information of the vehicle to set the control effort to appropriate level.

```
if (|θ_wda(k) - θ_wda(k-1)| > ΔΘ)
{
    F_PPH = 0;
}
``` where $\theta_{wda}(k)$ denotes the current value of the wheel departure angle and $\theta_{wda}(k-1)$ denotes the past value of the wheel departure angle.

In step 166, if the vehicle roll rate does not exceed a threshold $\Omega_{PPH}$ (16 degree/sec in the present example) within last 1 second, the vehicle is identified as not in the bouncing mode. Hence proportional peak hold will be ended in step 164. In this case, there is no need to hold brake pressure. Exiting enforced proportional peak hold pressure will allow the roll information of the vehicle to set the control effort to appropriate level.

```
if (|ω_x| < Ω_PPH during last 1 second)
{
    F_PPH = 0;
}
```

Figure 11:
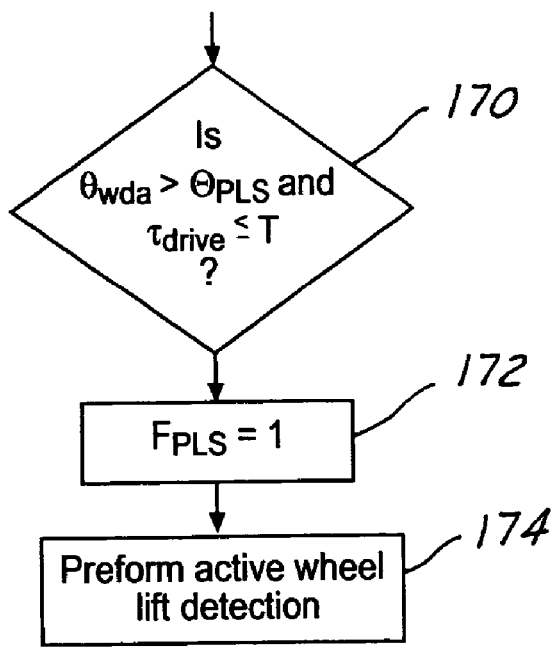
FIG. 11 is a flow chart illustrating the timing of active wheel lift detection.

Referring now to FIG. 11, it may be desirable to start active wheel lift detection early. Although the passive wheel lift detection is performed all the time, the active wheel lift detection is conditionally performed. For example, only if the RSC enters PID control mode the active wheel lift detection is activated. Since the PID control is related to roll trend conditioned by the wheel lifting information and there is a delay between the beginning of the active detection and the time when the detection resets the flag, there may be cases where a long lasting un-necessary activation from the PID controller is performed. The active wheel lift detection may thus be performed before the PID controller is activated. The delay due to the active wheel lift detection consequently may be removed. This implies the need for an earlier active wheel lift detection, which may be called pre-lift sensing. That is before entering the PID control mode and the transitional control mode, the active wheel lift detection will start to proceed under certain conditions. One of the conditions is dependent on the wheel departure angle. If the wheel departure angle is greater than certain threshold and the driving torque at the axle is below certain threshold in step 170, a prelifting flag is set in step 172, the active wheel lift detection will request engine torque reduction or provide a pressure command to the wheel in step 174. In this manner, un-necessary false activations can be avoided or the false activation can be shorted in duration. The logic can be expressed as in the following:

```
if (|θ_wda| > Θ_PLS & & τ_drive ≦ T)
{
    F_PLS = 1;
}
``` where $F_{PLS}$ is the flag for pre-lift sensing, i.e, $F_{PLS}=1$ will initiate pre-lift sensing, and $\tau_{drive}$ is the drive torque at the interested wheel.

As is described above, various ways of sensitizing or desensitizing roll control are described. Depending on the various system requirements one, some or all of the ways may be implemented in a commercial embodiment.

While the invention has been described in connection with one or more embodiments, it should be understood that the invention is not limited to those embodiments. On the contrary, the invention is intended to cover all alternatives, modifications, and equivalents, as may be included within the spirit and scope of the appended claims.

What is claimed is:

1. A method of operating a control system for an automotive vehicle comprising:
   determining a relative roll angle;
   when the relative roll angle reaches a threshold, initiating a wheel departure angle determination; and
   controlling a safety system in response to the wheel departure angle.

2. A method as recited in claim 1 further comprising determining the vehicle is in a transition; and
   when the relative roll angle reaches a threshold and the vehicle is in the transition, initiating a determination of a wheel departure angle.

3. A method as recited in claim 1 wherein the transition is a right to left transition.

4. A method as recited in claim 1 wherein the transition is a left to right transition.

5. A method as recited in claim 1 wherein the step of initiating is performed when the relative roll angle increases to the threshold.

6. A method as recited in claim 1 further comprising a generating a roll signal for control in response to the wheel departure angle and wherein controlling a safety system comprises controlling a safety system in response to the roll signal for control.

7. A method as recited in claim 1 wherein controlling a safety system comprises controlling a rollover control system to counteract a vehicle rollover.

8. A method as recited in claim 1 further comprising detecting a double wheel lift; and
   boosting the roll signal for control in response to the double wheel lift.

9. A method as recited in claim 1 further comprising applying a brake pressure to counteract rollover, determining the vehicle may be bouncing, in response to bouncing holding the brake pressure.

10. A method of operating a control system for an automotive vehicle comprising:
    determining the vehicle is in a transition;
    determining a relative roll angle;
    when the relative roll angle reaches a threshold and the vehicle is in a transition, initiating a wheel departure angle determination;
    determining a roll signal for control in response to the wheel departure angle; and
    controlling a safety system in response to the roll signal for control.

11. A method as recited in claim 10 further comprising detecting a double wheel lift; and
    boosting the roll signal for control in response to the double wheel lift.

12. A method as recited in claim 10 further comprising applying a brake pressure to counteract rollover, determining the vehicle may be bouncing, in response to bouncing holding the brake pressure.

13. A method of controlling a vehicle comprising:
    determining a roll signal for control;
    determining a relative roll angle;
    determining a double wheel lift; and
    in response to determining double wheel lift and the relative roll angle, increasing the roll signal for control to a boosted roll signal for control.

14. A method as recited in claim 13 further comprising performing the step of increasing the roll for control when the left side is lifted and the relative roll angle is positive.

15. A method as recited in claim 13 further comprising performing increasing when the right side is lifted and the relative roll angle is negative.

16. A method of controlling a vehicle comprising:
    applying a brake pressure to prevent rollover;
    determining the vehicle is bouncing; and
    holding the brake pressure when the vehicle is bouncing.

17. A method as recited in claim 10 wherein the transition is a right to left maneuver.

18. A method as recited in claim 10 wherein the transition is a left to right maneuver.

* * * * *